United States Patent [19]
Maeda et al.

[11] Patent Number: 6,074,321
[45] Date of Patent: Jun. 13, 2000

[54] TRANSAXLE ASSEMBLY

[75] Inventors: Hiroaki Maeda, Toyota; Yuki Tojima, Aichi-ken, both of Japan

[73] Assignee: Aisin Seiki Kabushiki Kaisha, Kariya, Japan

[21] Appl. No.: 09/163,566

[22] Filed: Sep. 30, 1998

[30] Foreign Application Priority Data

Sep. 30, 1997 [JP] Japan ................................ 9-265920

[51] Int. Cl.[7] .................................................. F16H 37/00
[52] U.S. Cl. .......................................................... 475/221
[58] Field of Search ................................. 475/221, 230

[56] References Cited

U.S. PATENT DOCUMENTS

| | | | |
|---|---|---|---|
| 4,412,459 | 11/1983 | Goscenski, Jr. .................... | 475/221 |
| 5,533,943 | 7/1996 | Ichioka et al. .................... | 475/198 |
| 5,554,080 | 9/1996 | Dangel .................... | 475/204 |

FOREIGN PATENT DOCUMENTS 2-286954   11/1990   Japan .

*Primary Examiner*—Dirk Wright
*Attorney, Agent, or Firm*—Burns, Doane, Swecker & Mathis, LLP

[57] ABSTRACT

A transaxle assembly comprising, a planetary gear unit including a planetary gear set to shift receiving torque from a power source, a differential including a differential case, a cross pin having a pinion gear and a pair of output members, each output member having a differential side gear to engage with the pinion gear respectively, the differential transmitting the torque from the planetary gear unit to the output members via a circled carrier connecting between the planetary gear unit and the differential, wherein the planetary gears located outside of the differential case, the carrier supporting both ends of the cross pin and contacting with the differential case.

18 Claims, 3 Drawing Sheets

TRANSAXLE ASSEMBLY

This application claims priority under 35 U.S.C. §119 with respect to Japanese Application No. 09(1997)-265900 on Sep. 30, 1997, the entire content of which is herein incorporated by reference.

FIELD OF THE INVENTION

The present invention generally relates to a vehicle axle assembly. More particularly, the present invention pertains to a transaxle assembly for a vehicle in which a shift mechanism and a differential are disposed in the same case.

BACKGROUND OF THE INVENTION

One type of conventional transaxle assembly is described in Japanese Unexamined Patent Publication No. Hei 2(1990)-286954. The transaxle assembly includes a planetary gear unit and a differential. The planetary gear unit has a planetary gear set. The differential includes a differential case, a cross pin having ends at which are fixed a pinion gear and a pair of output shafts at each of which is fixed a side differential gear so as to engage one of the pinion gears. The planetary gear unit and the differential are arranged in series which is parallel with respect to the output shafts. This arrangement increases the length of the transaxle assembly along the direction of the shafts. If the planetary gear unit includes a plurality of planetary gear sets, with each planetary gear set being arranged in series so as to obtain a large shift ratio, the arrangement of the planetary gear unit further increases the length of the transaxle assembly. Thus, a large space is required to assemble the transaxle assembly into vehicles.

Another conventional transaxle assembly is described in SAE Technical Paper Series No. 850198 entitled "Design of a Two-Speed Automatic Transaxle for an Electric Vehicle". This transaxle assembly is shown in FIG. 3. The transaxle assembly 30 includes a planetary gear set 32 and a differential 31. The differential 31 has a differential case 31a, a cross pin 31b and a pair of output shaft 34, 35. The differential case 31a has a carrier portion 33 which is integrally formed with the differential case 31a. The carrier portion 33 extends outwardly from the differential case 31. The outer end of the carrier portion 33 receives a plurality of pinion pins 32a which each support a planetary gear 32b. The planetary gear set 32 and the differential 31 are arranged in parallel with respect to the axis of the output shafts 34, 35. Accordingly, this arrangement decreases the length of the transaxle assembly 30 along the direction of the shafts 34, 35. However, the carrier portion 33 of the transaxle assembly 30 is arranged around the differential case 31 such that the cross pin 31b has to be inserted through a small clearance between the planetary gears 32b when the transaxle assembly 30 is assembled. Therefore, a relatively long time is required to assemble the transaxle assembly 30 and the assembly can be somewhat difficult.

SUMMARY OF THE INVENTION

According to one aspect of the invention, a transaxle assembly includes a planetary gear unit provided with a planetary gear set for shifting receiving torque from a power source, and a differential. The differential includes a differential case, a cross pin having a pair of pinion gears and a pair of output members. The output members have a differential side gear for engaging a respective pinion gear. The differential transmits torque from the planetary gear unit to the output members via an annular carrier connecting the planetary gear unit and the differential. The planetary gears are located outside of the differential case, and the carrier supports opposite ends of the cross pin and contacts the differential case.

In accordance with another aspect of the invention, a transaxle assembly includes a planetary gear unit provided with a planetary gear set which receives torque from a power source and has gear teeth. A differential includes a differential case having a contacting surface, a cross pin on which are mounted a pair of pinion gears, and a pair of differential side gears which each engage at least one of the pinion gears, with the planetary gears being located outside of the differential case. A carrier is provided for transmitting torque from the planetary gear unit to the differential side gears. The carrier has a contacting surface which contacts the contacting surface of the differential case, with the contacting surfaces of the carrier and the differential case having a diameter smaller than the diameter of the gear teeth of the planetary gear set.

According to a further aspect of the invention, a transaxle assembly includes a planetary gear unit provided with a planetary gear set which receives torque from a power source, a differential, and a carrier. The differential includes a differential case, a cross pin on which are mounted a pair of pinion gears, and a pair of differential side gears which each engage at least one of the pinion gears. The planetary gears are located outside of the differential case and the cross pin has opposite ends provided with a stepped portion. The carrier transmits torque from the planetary gear unit to the differential side gears and includes a supporting portion which receives the stepped portion at each end of the cross pin.

BRIEF DESCRIPTION OF THE DRAWING FIGURES

Additional details and features of the present invention will become more apparent from the following detailed description considered with reference to the accompanying drawing figures in which like numerals refer to like parts and wherein.

DETAILED DESCRIPTION OF PREFERRED EMBODIMENT

Figure 1:
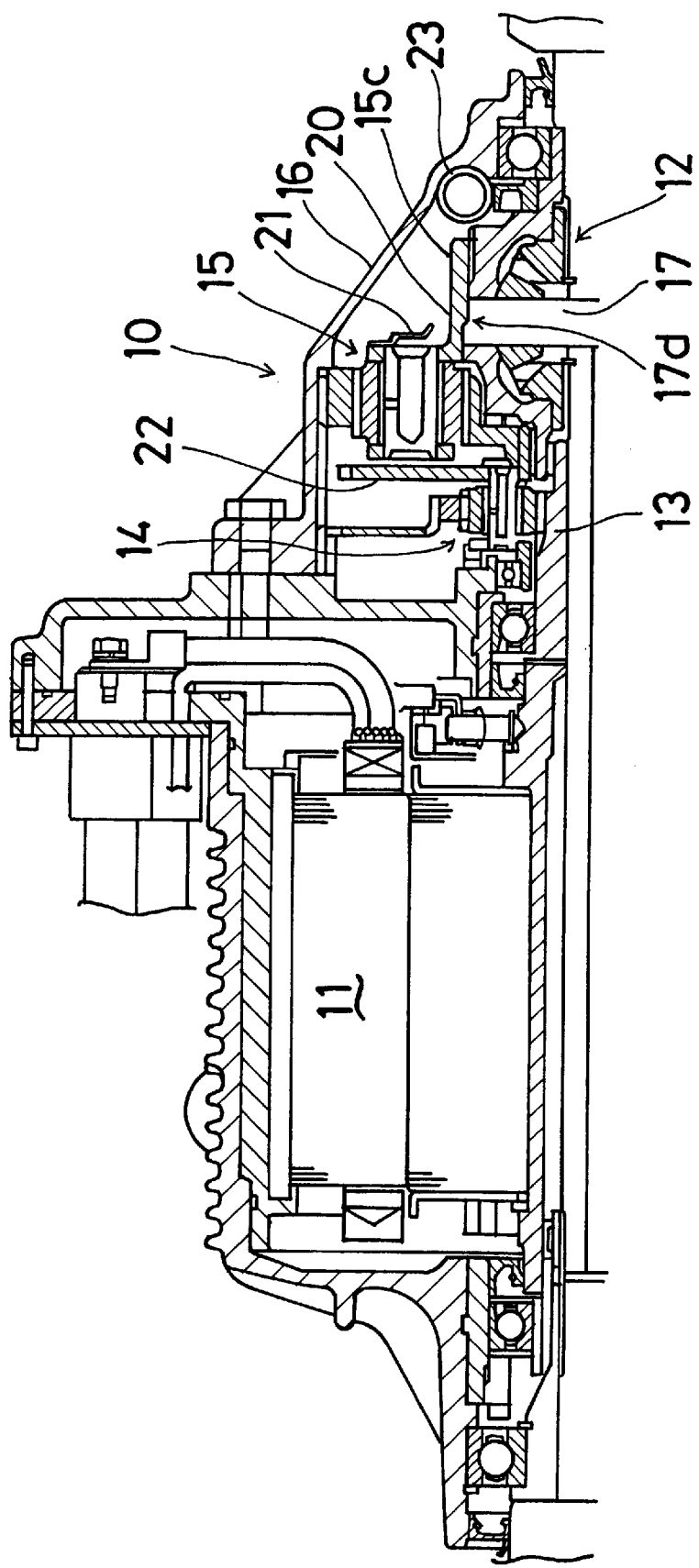
FIG. 1 is a cross-sectional view of a transaxle assembly in accordance with the preferred embodiment of the present invention.
Figure 2:
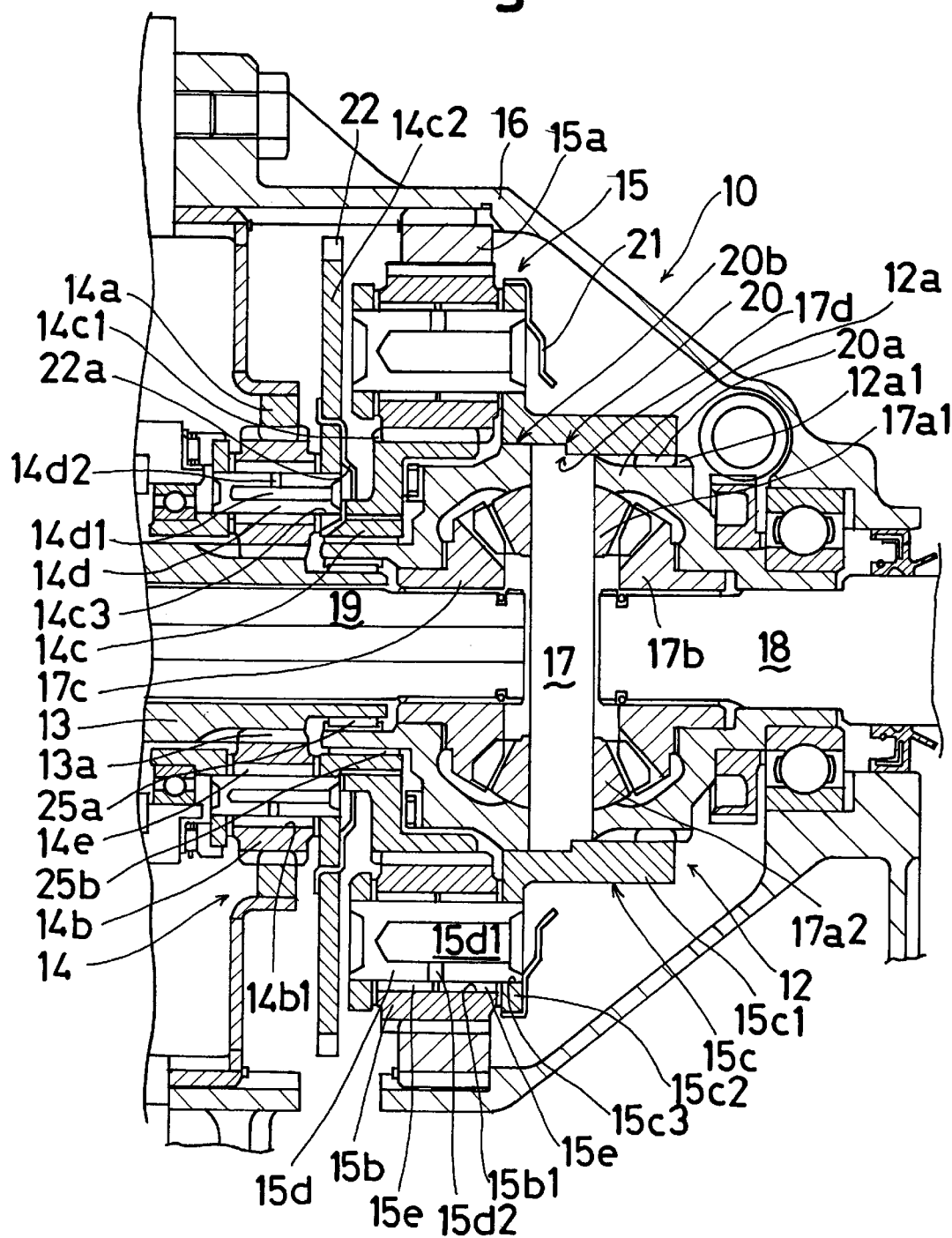
FIG. 2 is an enlarged cross-sectional view of the transaxle assembly in accordance with the preferred embodiment of the present invention.
Figure 3:
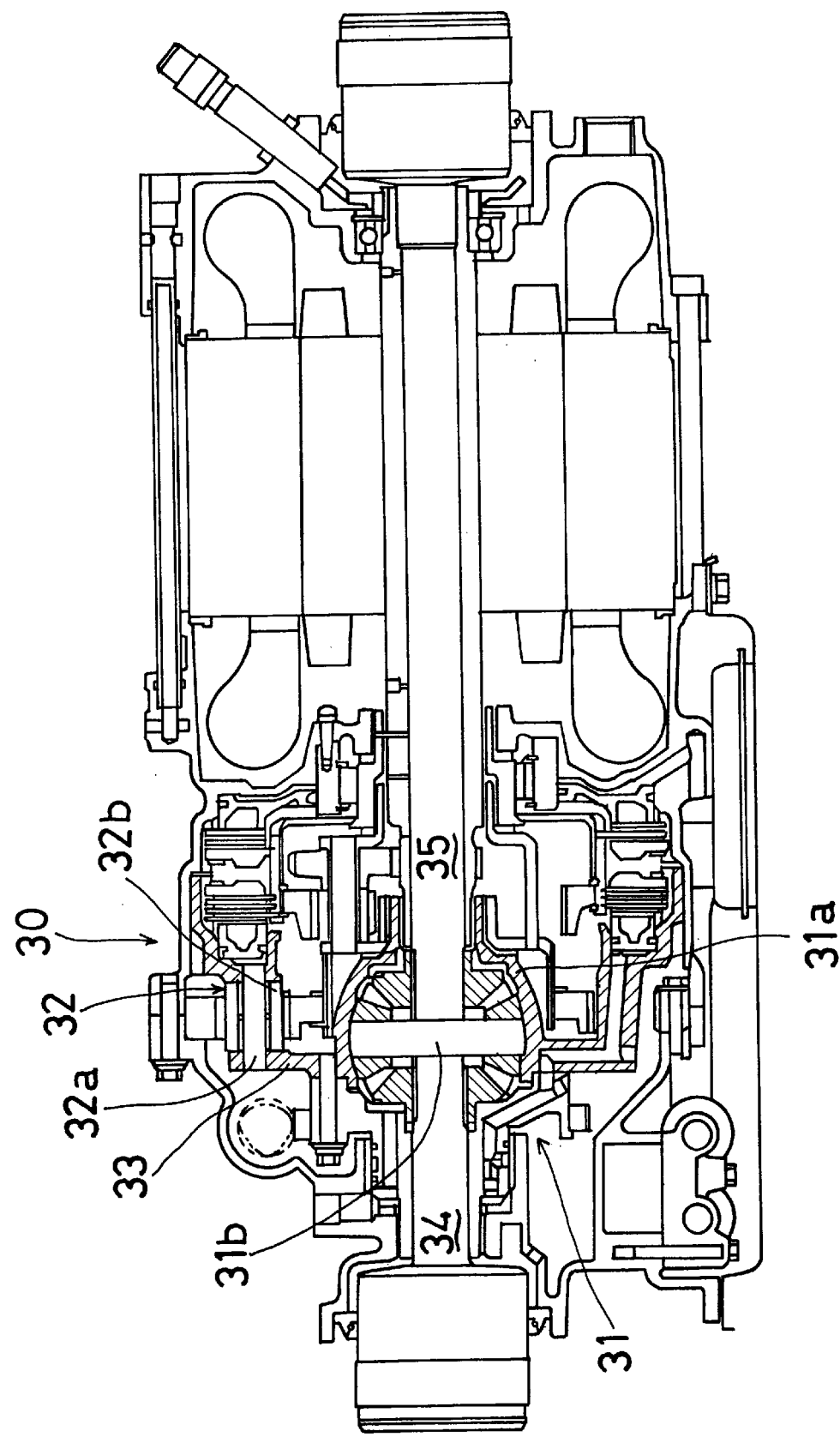
FIG. 3 is a cross-sectional view of a conventional transaxles assembly.

FIG. 1 shows a transaxle assembly 10 for an electric vehicle whose power source is an electric motor 11. The electric motor 11 rotates a shaft 13. The transaxle assembly 10 includes a planetary gear unit and a differential 12 as shown in FIG. 2. The planetary gear unit includes a first planetary gear set 14 and a second planetary gear set 15.

The first planetary gear set 14 has several planetary gears 14b which are arranged around the shaft 13. Each planetary gear 14b engages with both an outer gear portion 13a of the shaft 13 and a first ring gear 14a. The first ring gear 14a is fixed to a transaxle housing 16. A connecting member 14c is located between the first planetary gear set 14 and the second planetary gear set 15. The connecting member 14c includes an outer gear portion 14c1 and a disk portion 14c2 which extends radially with respect to the axis of the shaft 13. The disk portion 14c2 has several holes 14c3 for receiving a pinion pin 14d which is inserted into a center hole 14b1 of the planetary gear 14b. A plurality of roller bearings 14e are located between the inside ring surface of the center hole 14b1 and the outside surface of the pinion pin 14d.

The disk portion 14c2 supports an oil receiving member 22a. The pinion pin 14d is provided with a longitudinally extending hole 14d1 which extends along the axis of the pinion pin 14d and a hole 14d2 which extends radially with respect to the axis of the hole 14d1. The oil receiving member 22a supplies lubricating oil to the roller bearings 14e through the holes 14d1 and 14d2. A parking lock gear 22 is formed in the outer peripheral border portion of the disk portion 14c2 to engage a parking lock pole (not specifically shown) such that the connecting member 14c is prevented from rotating against the rotating torque of the electric motor 11. The parking lock pole is adapted to engage the parking lock gear when the shift lever of an automatic transmission is in the park position.

The second planetary gear set 15 has several planetary gears 15b which are arranged in a circle. Each planetary gear 15b engages with both an outer gear portion 14c1 of the connecting member 14c and a second ring gear 15a. The second ring gear 15a is fixed to the transaxle housing 16, and a carrier 15c is located between the second planetary gear set 15 and the differential 12. The carrier 15c includes a cylindrical portion 15c1, whose inside surface has a stepped portion 20 and a ring splined portion 20a, and a disk portion 15c2 which extends radially with respect to the axial direction of the shaft 13. The disk portion 15c2 has several holes 15c3 for each receiving a pinion pin 15d inserted into a center hole 15b1 of the planetary gear 15b. A plurality of roller bearings 15e are located between the inside ring surface of the center hole 15b1 and the outside surface of the pinion pin 15d.

At the outer end surface of the disk portion 15c2, the disk portion 15c2 supports an oil receiving member 21. The pinion pin 15d has a longitudinally extending hole 15d1 which extends along the axis of the pinion pin 15d and a hole 15d2 which extends radially with respect to the axis of the hole 15d1. The oil receiving member 21 supplies lubricating oil to the roller bearings 15e through the holes 15d1 and 15d2.

The differential 12 includes a differential case 12a, a cross pin 17, a pair of pinion gears 17a1, 17a2, and differential side gears 17b, 17c. The cross pin 17, the pinion gears 17a1, 17a2, and the differential side gears 17b, 17c are disposed within the differential case 12a. The cross pin 17 is formed as a cylindrical member. The cross pin 17 includes a pair of stepped portions 17d which are disposed on each end of the cross pin 17. The stepped portions 17d are adapted to engage the stepped portion 20 of the carrier 15c. The cross pin 17 thus rotates with the carrier 15c around the axis of the output shafts 18, 19 and prevents rotational movement of the cross pin 17 about its longitudinal axis. The pinion gears 17a1, 17a2 are loosely received on the cylindrical outer surface of the cross pin 17. The pinion gears 17a1, 17a2 are thus able to rotate around the cylindrical outer surface of the cross pin 17.

The differential side gear 17b is fixed to the end portion of the output shaft 18, and the differential side gear 17c is fixed to the end portion of the output shaft 19. The opposite end portion of the output shaft 18 and the opposite end portion of the output shaft 19 are respectively fixed to a wheel (not specifically shown). Both of the differential side gears 17b, 17c engage both of the pinion gears 17a1, 17a2.

The outer surface of the differential case 12a is provided with a splined portion 12a1. The splined portion 12a1 engages the ring or annular splined portion 20a of the carrier 15c such that the outer surface of the differential case 12a is covered by the carrier 15c. In the radial direction with respect to the axis of the output shafts 18, 19, the diameter of a connecting ring surface 20b between the carrier 15c and the differential case 12a is smaller than the diameter of engagement with between the outer gear portion 14c1 of the connecting member 14c and the planetary gear 15b. In other words, the diameter of the contacting surface between the carrier 15c and the differential case 12a is smaller than the diameter of the planetary gear 15b. Thus, when the transaxle assembly is assembled, the cross pin 17 is inserted into the differential case 12a, and then the differential case 12a and the cross pin 17 are inserted into the gear set 15 and the carrier 15a until the stepped portion 20 of the carrier 15a is contacted by the stepped portion 17d of the cross pin 17.

The operation of the transaxle assembly having the above described construction is as follows.

The rotational torque resulting from operation of the electric motor 11 is transmitted to the shaft 13. The planetary gears 14b of the first planetary gear set 14, which engage both the outer gear portion 13a of the shaft 13 and the first ring gear 14a, rotate and revolve with the shaft 13. With the planetary gears 14b revolving around the shaft 13, the connecting member 14c, which is connected with the planetary gears 14b via the pinion pins 14d, also revolves around the shaft 13 at the same revolutional speed as the planetary gears 14b. Upon the connecting member 14c revolving around the shaft 13, the planetary gears 15b of the second planetary gear set 15, which engage both the outer gear portion 14c1 of the connecting member 14c and the second ring gear 15a, rotate and revolve around the output shaft 19. When the planetary gears 15b revolve around the output shaft 19, the carrier 15c which is connected with the planetary gears 15b via the pinion pins 15d, rotates around the output shafts 18, 19 at the same revolutional speed as the planetary gears 15b. As the carrier 15c rotates around the axis of the output shafts 18, 19, both the differential case 12a and the cross pin 17 rotate around the axis of the output shafts 18, 19 with the carrier 15c. Therefore, the rotational torque of the cross pin 17 is transmitted to both the output shafts 18, 19 to rotate the wheels via engagement between the pinion gears 17a1, 17a2 and the differential side gears 17b, 17c.

A bearing 25a is disposed between the differential case 12a and the shaft 13, and a bearing 25b is disposed between the differential case 12a and the connecting member 14c. Thus, the differential case 12a is able to relatively rotate against the shaft 13 and the connecting member 14c.

If the rotational speeds of the output shafts 18, 19 are not the same, for example the vehicle is turning, the cross pin 17 rotates around the axis of the output shaft 18, 19 in concurrence with the pinion gears 17a1, 17a2 rotating around the axis of the cross pin 17. Accordingly, the rotational speed of each output shaft 18, 19 is variable such that the rotational speed gap between the output shafts 18, 19 can be absorbed.

The above embodiment of the transaxle assembly 10 is driven by the electric motor 11 as a power source. However, it is to be understood that the power source is not limited to the electric motor 11, but can also include an internal combustion engine or a hybrid system which combines an electric motor and an internal combustion engine.

The principles, a preferred embodiment and the mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A transaxle assembly comprising:
   a planetary gear unit including a planetary gear set for shifting receiving torque from a power source; and
   a differential including a differential case, a cross pin having a pair of pinion gears and a pair of output members, each output member having a differential side gear to engage a respective pinion gear, the differential transmitting torque from the planetary gear unit to the output members via an annular carrier connecting the planetary gear unit and the differential, the planetary gears being located outside of differential case, and the carrier supporting opposite ends of the cross pin and contacting the differential case, each end of the cross pin including a stepped portion and the carrier including a supporting portion which receives the stepped portion of the end of the cross pin.

2. A transaxle assembly according to claim 1, wherein a diameter of a contacting surface between the carrier and the differential case is smaller than a diameter of the planetary gear set.

3. A transaxle assembly according to claim 1, wherein the planetary gear unit includes a first planetary gear set connected with the power source, a second planetary gear set located outside of the differential case and a connecting member connecting the first planetary gear set and the second planetary gear set.

4. A transaxle assembly according to claim 1, wherein the carrier supports an oil receiving portion to supply lubricating oil to the planetary gear set of the planetary gear unit.

5. A transaxle assembly comprising:
   a planetary gear unit including a planetary gear set for shifting receiving torque from a power source; and
   a differential including a differential case, a cross pin having a pair of pinion gears and a pair of output members, each output member having a differential side gear to engage a respective pinion gear, the differential transmitting torque from the planetary gear unit to the output members via an annular carrier connecting the planetary gear unit and the differential, the planetary gears being located outside of the differential case, and the carrier supporting opposite ends of the cross pin and contacting the differential case, the planetary gear unit including a first planetary gear set connected with the power source, a second planetary gear set located outside of the differential case and a connecting member connecting the first planetary gear set and the second planetary gear set, the connecting member including an integrally formed parking gear portion.

6. A transaxle assembly according to claim 5, wherein the parking gear portion of the connecting member is located outside of the first planetary gear set.

7. A transaxle assembly according to claim 5, wherein the carrier supports an oil receiving portion to supply lubricating oil to the first planetary gear set of the planetary gear unit.

8. A transaxle assembly comprising:
   a planetary gear unit including a planetary gear set which receives torque from a power source, the planetary gear set having gear teeth;
   a differential including a differential case having a contacting surface, a cross pin on which are mounted a pair of pinion gears, and a pair of differential side gears which each engage at least one of the pinion gears, the planetary gears being located outside of the differential case;
   a carrier that includes a contacting surface which contacts the contacting surface of the differential case, the contacting surfaces of the carrier and the differential case having a diameter smaller than a diameter of the gear teeth of the planetary gear set, the differential transmitting torque from the planetary gear unit to the differential side gears by way of the carrier.

9. A transaxle assembly according to claim 8, wherein each end of the cross pin includes a stepped portion and the carrier includes a supporting portion which receives the stepped portion of the end of the cross pin.

10. A transaxle assembly according to claim 8, wherein the planetary gear unit includes a first planetary gear set connected with the power source, a second planetary gear set located outside of the differential case and a connecting member connecting the first planetary gear set and the second planetary gear set.

11. A transaxle assembly according to claim 10, wherein the carrier supports an oil receiving portion to supply lubricating oil to the first planetary gear set of the planetary gear unit.

12. A transaxle assembly according to claim 8, wherein the carrier supports an oil receiving portion to supply lubricating oil to the planetary gear set of the planetary gear unit.

13. A transaxle assembly comprising:
   a planetary gear unit including a planetary gear set which receives torque from a power source;
   a differential including a differential case, a cross pin on which are mounted a pair of pinion gears, and a pair of differential side gears which each engage at least one of the pinion gears, the planetary gears being located outside of the differential case, the cross pin having opposite ends provided with a stepped portion;
   a carrier for transmitting torque from the planetary gear unit to the differential side gears, the carrier including a supporting portion which receives the stepped portion at each end of the cross pin.

14. A transaxle assembly according to claim 13, wherein the planetary gear unit includes a first planetary gear set connected with the power source, a second planetary gear set located outside of the differential case and a connecting member connecting the first planetary gear set and the second planetary gear set.

15. A transaxle assembly according to claim 14, wherein the connecting member includes an integrally formed parking gear portion.

16. A transaxle assembly according to claim 15, wherein the parking gear portion of the connecting member is located radially outwardly of the first planetary gear set.

17. A transaxle assembly according to claim 14, wherein the carrier supports an oil receiving portion to supply lubricating oil to the first planetary gear set of the planetary gear unit.

18. A transaxle assembly according to claim 13, wherein the carrier supports an oil receiving portion to supply lubricating oil to the planetary gear set of the planetary gear unit.

* * * * *